US012689147B2

(12) United States Patent
Wang et al.

(10) Patent No.: US 12,689,147 B2
(45) Date of Patent: Jul. 21, 2026

(54) CONNECTOR MODULE, CONNECTOR, AND CONNECTOR ASSEMBLY

(71) Applicants: Tyco Electronics (Suzhou) Ltd., Suzhou (CN); Tyco Electronics (Shanghai) Co., Ltd., Shanghai (CN)

(72) Inventors: Jian Wang, Suzhou (CN); Feng (Charles) Wan, Shanghai (CN); Zhaowen Zhou, Shanghai (CN)

(73) Assignees: Tyco Electronics (Shanghai) Co., Ltd., Shanghai (CN); Tyco Electronics (Suzhou) Ltd., Suzhou (CN)

( * ) Notice: Subject to any disclaimer, the term of this patent is extended or adjusted under 35 U.S.C. 154(b) by 299 days.

(21) Appl. No.: 18/243,732

(22) Filed: Sep. 8, 2023

(65) Prior Publication Data

US 2024/0088597 A1 Mar. 14, 2024

(30) Foreign Application Priority Data

Sep. 9, 2022 (CN) ......................... 202222401084.2

(51) Int. Cl.
*H01R 13/436* (2006.01)

(52) U.S. Cl.
CPC ................................ *H01R 13/4362* (2013.01)

(58) Field of Classification Search
CPC .................................................. H01R 13/4362
USPC .......................................................... 439/752
See application file for complete search history.

(56) References Cited

U.S. PATENT DOCUMENTS

| | | | | |
|---|---|---|---|---|
| 5,100,345 A * | 3/1992 | Endo | H01R 13/4362 | 439/598 |
| 6,402,573 B1 * | 6/2002 | Yeomans | H01R 13/4362 | 439/752 |
| 7,044,808 B1 * | 5/2006 | Foltz | H01R 13/4362 | 439/752 |
| 2007/0093131 A1 * | 4/2007 | Takahashi | H01R 13/4361 | 439/595 |

* cited by examiner

*Primary Examiner* — Tulsidas C Patel
*Assistant Examiner* — Thaslimur Rahman
(74) *Attorney, Agent, or Firm* — Barley Snyder

(57) ABSTRACT

A connector module includes an insulator with a terminal slot accommodating a terminal and a tool insertion port in communication with the terminal slot. A terminal locking member of the connector is installed on the insulator and movable between a pre locking position separated from the terminal and a final locking position engaged with the terminal. When the terminal locking member is in the pre locking position, the tool insertion port is not blocked by the terminal locking member to allow an operating tool to be inserted into the terminal slot through the tool insertion port to drive a locking spring of the terminal to an unlocking position separated from the insulator. With the terminal locking member in the final locking position, the tool insertion port is blocked by the terminal locking member to prevent the operating tool from being inserted into the terminal slot through the tool insertion port.

20 Claims, 9 Drawing Sheets

CONNECTOR MODULE, CONNECTOR, AND CONNECTOR ASSEMBLY

CROSS-REFERENCE TO RELATED APPLICATION

This application claims the benefit of Chinese Patent Application No. CN202222401084.2 filed on Sep. 9, 2022, in the State Intellectual Property Office of China, the whole disclosure of which is incorporated herein by reference.

FIELD OF THE INVENTION

The present disclosure relates to a connector module, a connector including the connector module, and a connector assembly including the connector.

BACKGROUND

A connector typically includes an insulator, a terminal, and a terminal locking member. A terminal slot and a locking member installation slot are formed in the insulator. The terminal is inserted into the terminal slot on the insulator. The terminal locking member is installed into the locking member installation slot on the insulator. For ease of operation, the terminal locking member is usually able to be moved between a pre locking position separated from the terminal and a final locking position engaged with the terminal.

Prior art terminals typically have a locking spring (commonly referred to as a primary lock) that latch onto the inner wall of the terminal slot. The terminal locking member (usually referred to as a secondary lock) and the locking spring together lock the terminal in the terminal slot. Therefore, before pulling out the terminal from the terminal slot, it is necessary to first move the terminal locking member from the final locking position to the pre locking position, then insert the operating tool into the terminal slot to drive the locking spring to the unlocking position that is separated from the inner wall of the terminal slot, and finally pull out the terminal from the terminal slot. However, in practical applications, operators sometimes forget to move the terminal locking member from the final locking position to the pre locking position, which can cause damage to the terminal locking member or terminal when the terminal is pulled out.

SUMMARY

According to an embodiment of the present disclosure, a connector module includes an insulator formed with a terminal slot for accommodating a terminal and a tool insertion port in communication with the terminal slot. A terminal locking member of the connector is installed on the insulator and movable between a pre locking position separated from the terminal and a final locking position engaged with the terminal. When the terminal locking member is in the pre locking position, the tool insertion port is not blocked by the terminal locking member to allow an operating tool to be inserted into the terminal slot through the tool insertion port to drive a locking spring of the terminal to an unlocking position separated from the insulator. With the terminal locking member in the final locking position, the tool insertion port is blocked by the terminal locking member to prevent the operating tool from being inserted into the terminal slot through the tool insertion port. Thus, the locking spring of the terminal is prevented from being accidentally unlocked by the operating tool.

BRIEF DESCRIPTION OF THE DRAWINGS

The invention will now be described by way of example with reference to the accompanying Figures, of which.

DETAILED DESCRIPTION OF THE EMBODIMENTS

Figure 1:
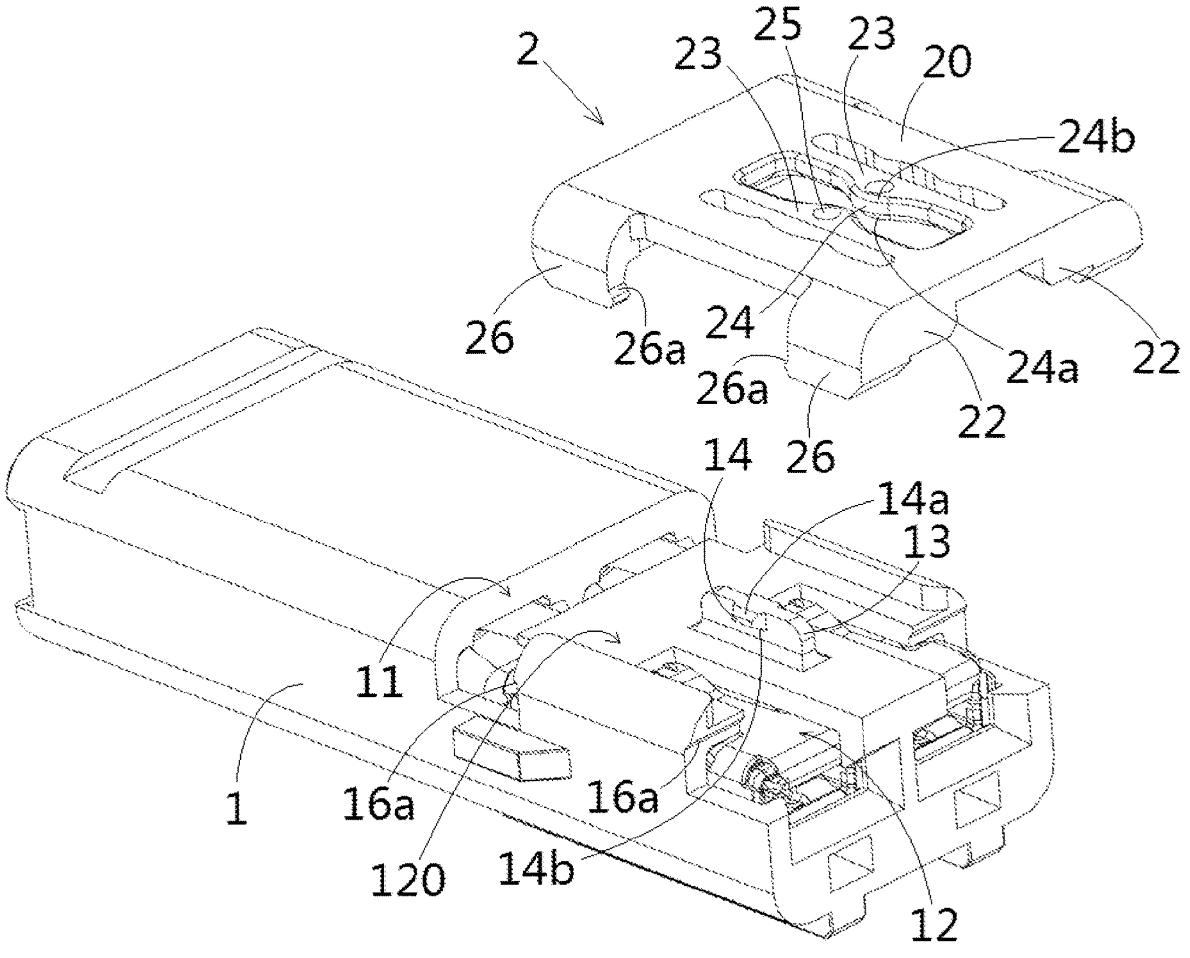
FIG. 1 is an illustrative exploded view of a connector module according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector module comprises an insulator formed with a terminal slot for accommodating a terminal and a tool insertion port communicated with the terminal slot, and a terminal locking member installed on the insulator. The terminal locking member is movable between a pre locking position separated from the terminal and a final locking position engaged with the terminal. When the terminal locking member is in the pre locking position, the tool insertion port is not blocked by the terminal locking member to allow an operating tool to be inserted into the terminal slot through the tool insertion port to drive a locking spring of the terminal to an unlocking position separated from the insulator. When the terminal locking member is in the final locking position, the tool insertion port is blocked by the terminal locking member. This prevents the operating tool from being inserted into the terminal slot through the tool insertion port, thereby preventing the locking spring of the terminal from being accidentally unlocked by the operating tool.

A connector according to another embodiment of the present disclosure comprises of a housing, and the above connector module installed in the housing. Likewise, a connector assembly according to an embodiment of the present disclosure includes the above connector, and a mating connector mated thereto.

Figure 2:
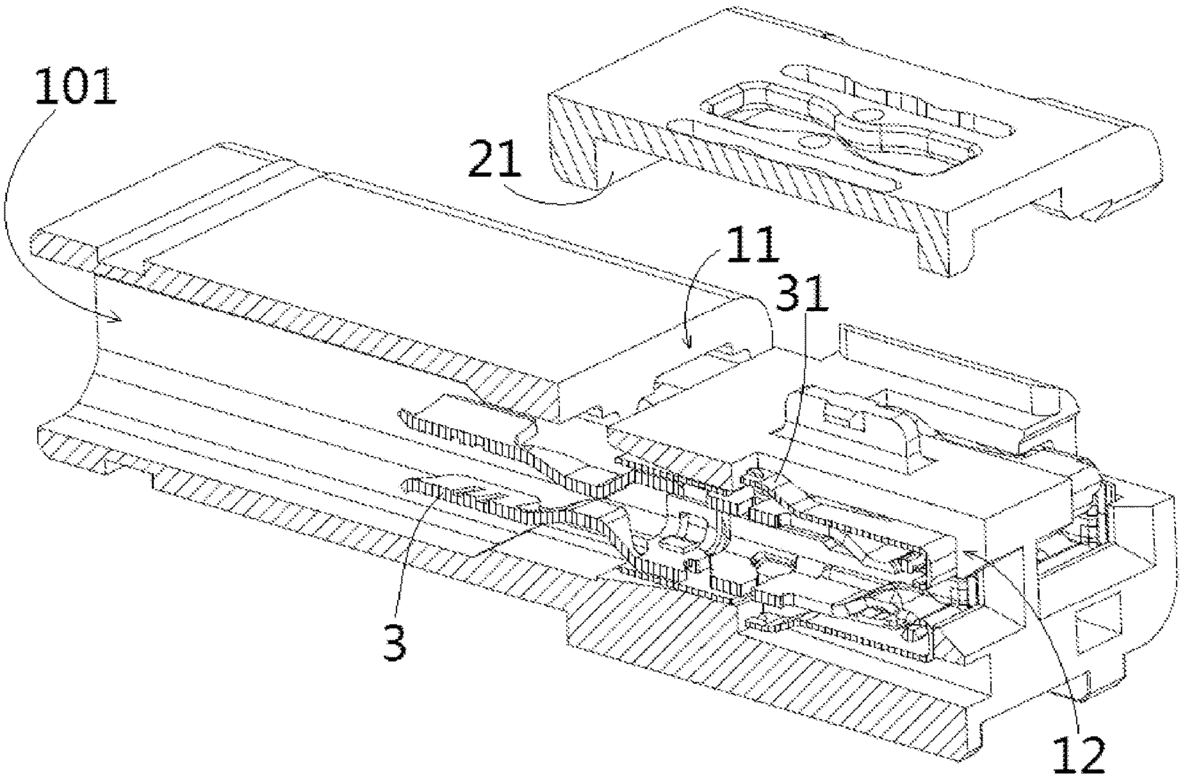
FIG. 2 is an illustrative exploded cross-sectional view of a connector module according to an exemplary embodiment of the present invention.
Figure 3:
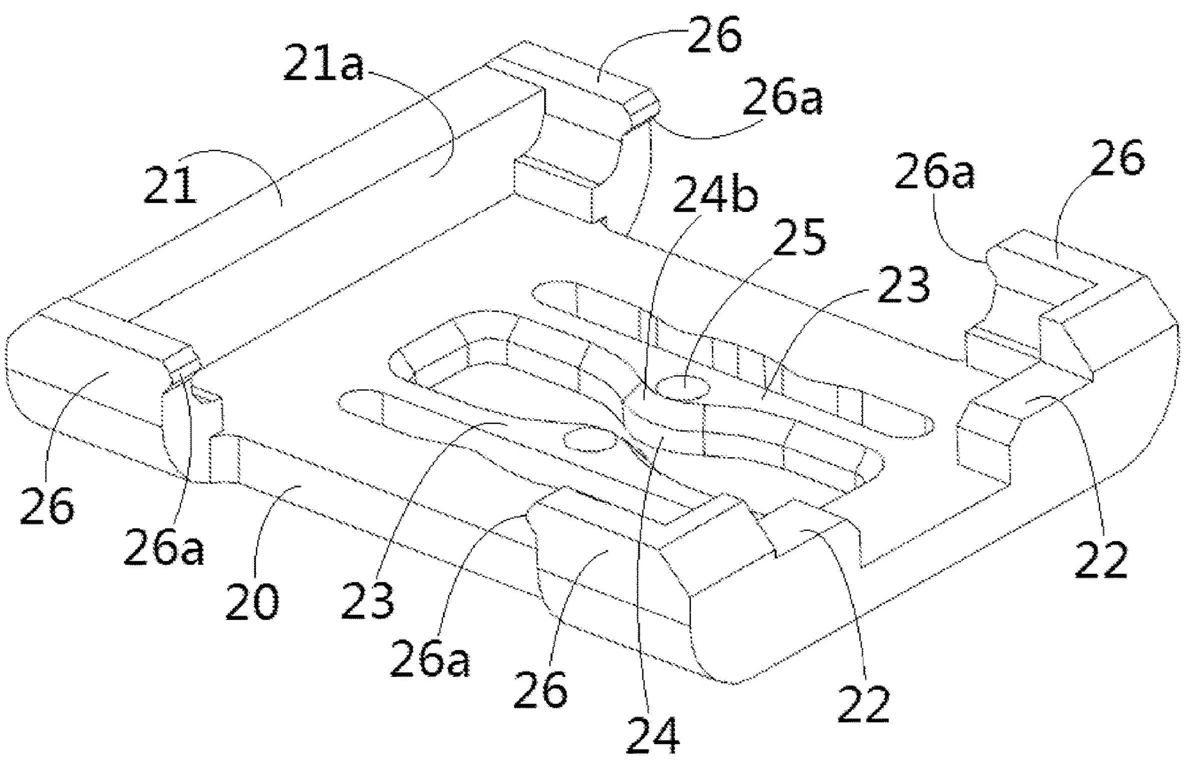
FIG. 3 is an illustrative perspective view of a terminal locking member of a connector module according to an exemplary embodiment of the present invention when viewed from the bottom.

FIG. 1 is an illustrative exploded view of a connector module according to an exemplary embodiment of the present invention. FIG. 2 is an illustrative exploded cross-sectional view of a connector module according to an exemplary embodiment of the present invention. FIG. 3 is an illustrative perspective view of the terminal locking member 2 of the connector module according to an exemplary embodiment of the present invention when viewed from the bottom. As shown in FIGS. 1-3, in an exemplary embodiment of the present invention, a connector module includes an insulator 1 and a terminal locking member 2 (commonly referred to as a secondary lock). The terminal locking member 2 is used to lock the terminals 3 (see FIG. 5) in insulator 1.

Figure 4:
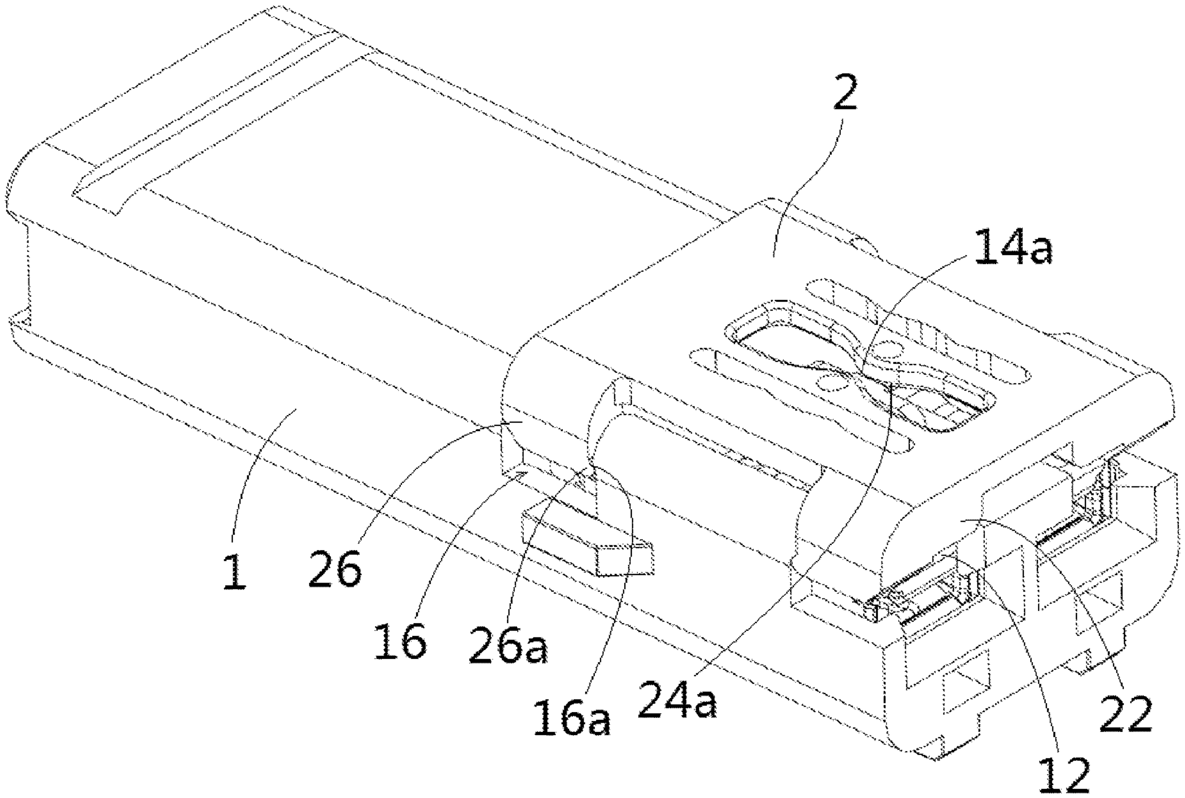
FIG. 4 is an illustrative perspective view of a connector module according to an exemplary embodiment of the present invention, wherein the terminal locking member is in a pre locking position.
Figure 5:
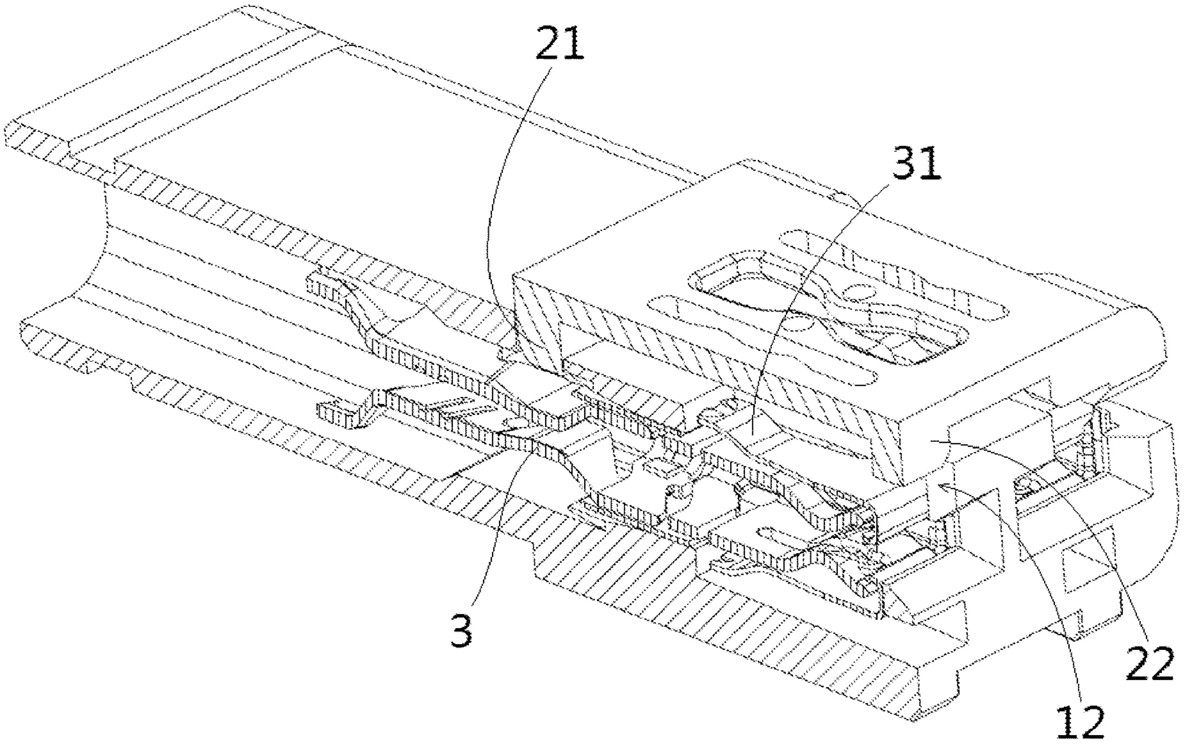
FIG. 5 is a longitudinal cross-sectional view of a connector module according to an exemplary embodiment of the present invention, wherein the terminal locking member is in a pre locking position.
Figure 6:
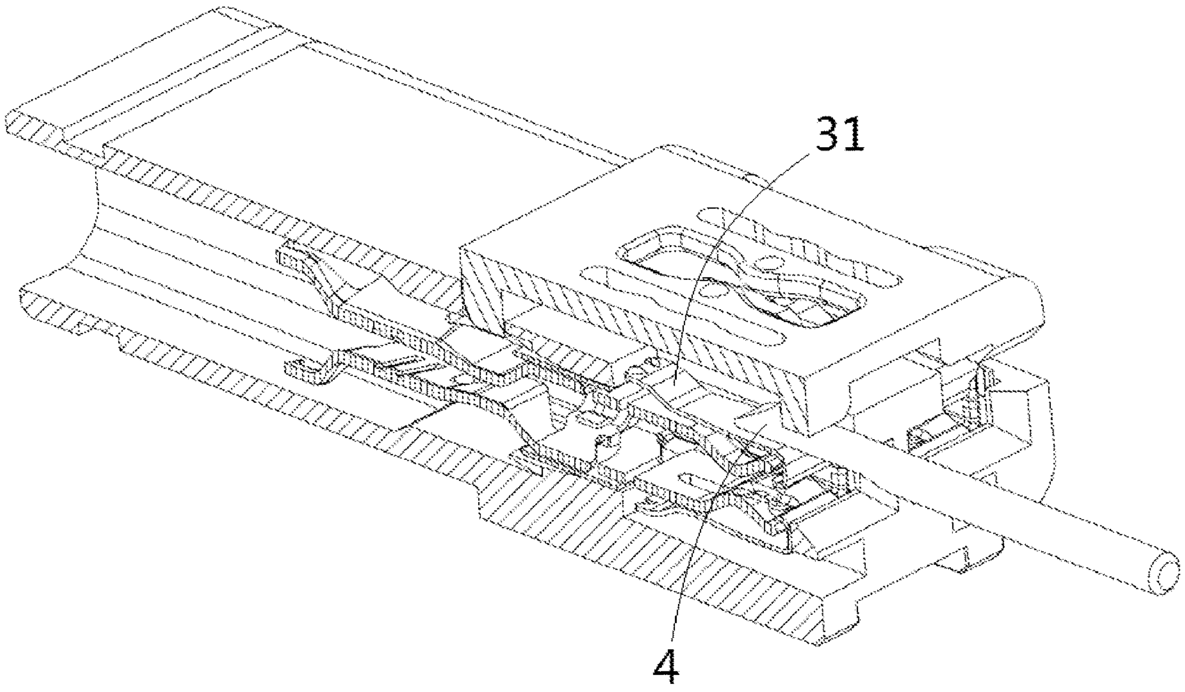
FIG. 6 is a longitudinal cross-sectional view of a connector module according to an exemplary embodiment of the present invention, wherein the terminal locking member is in a pre locking position and the insertion operation tool is shown.
Figure 7:
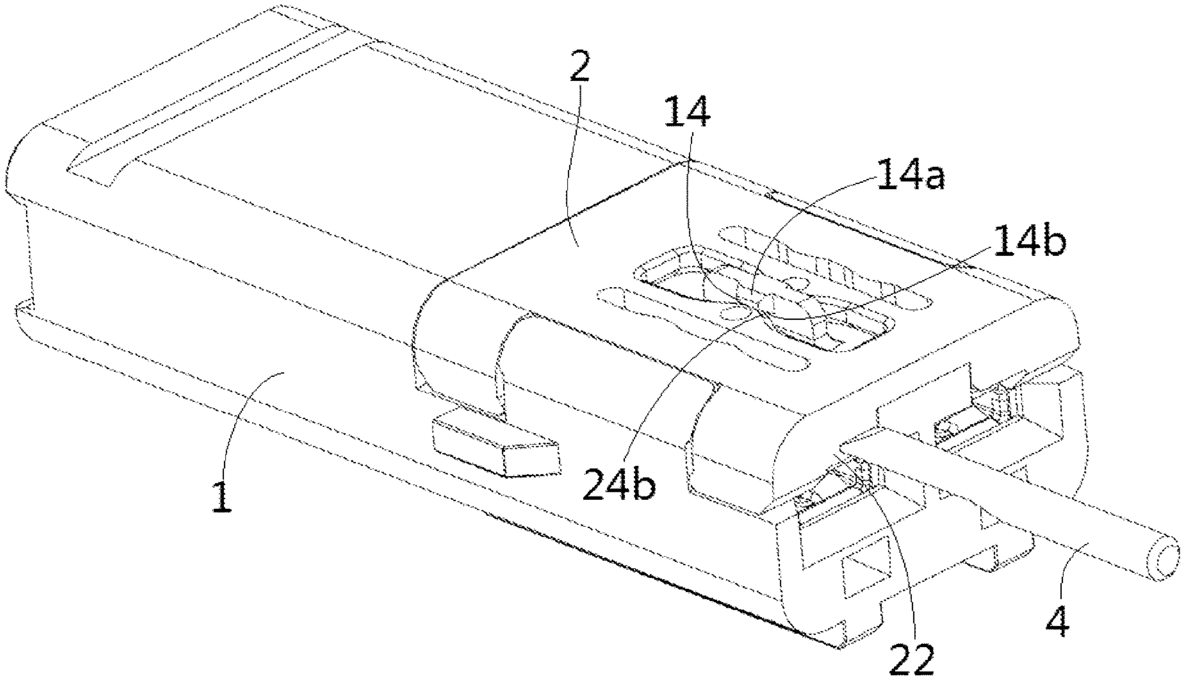
FIG. 7 is an illustrative perspective view of a connector module according to an exemplary embodiment of the present invention, wherein the terminal locking member is in the final locking position.
Figure 8:
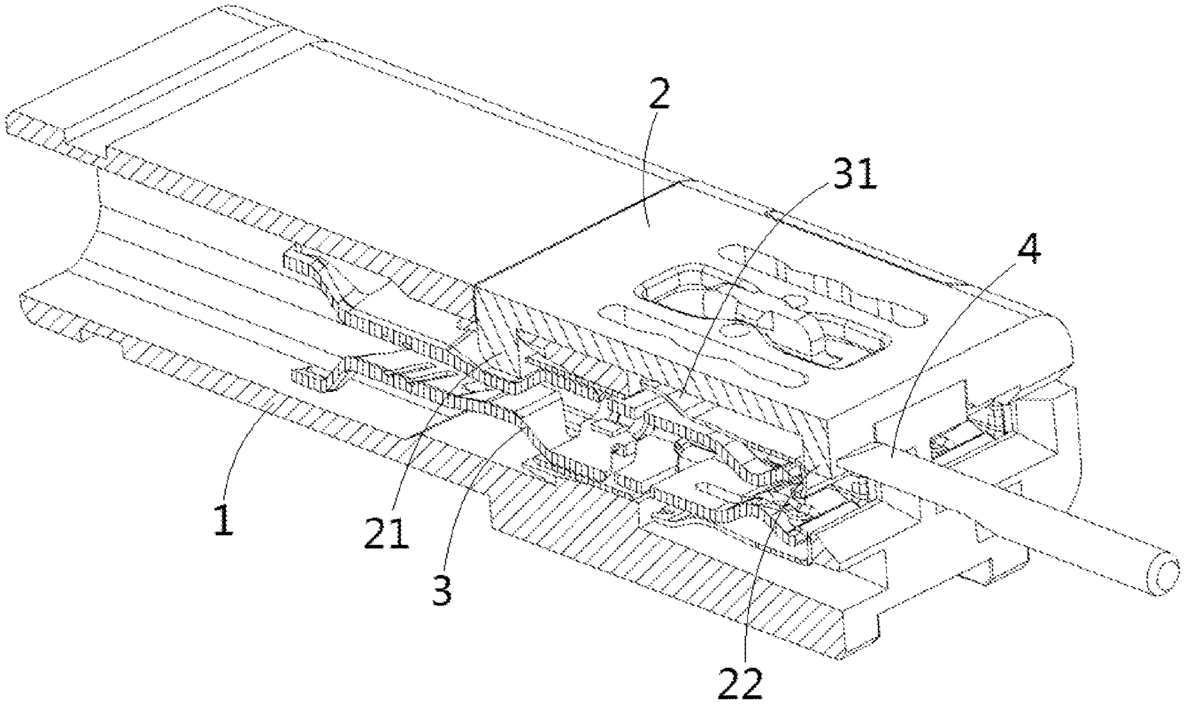
FIG. 8 shows a longitudinal cross-sectional view of a connector module according to an exemplary embodiment of the present invention, wherein the terminal locking member is in the final locking position.

FIG. 4 is an illustrative perspective view of a connector module according to an exemplary embodiment of the present invention, wherein the terminal locking member 2 is in a pre locking position. FIG. 5 is a longitudinal cross-sectional view of a connector module according to an exemplary embodiment of the present invention, wherein the terminal locking member 2 is in a pre locking position. FIG. 6 is a longitudinal cross-sectional view of a connector module according to an exemplary embodiment of the present invention, wherein the terminal locking member 2 is in the pre locking position and the inserted operating tool 4 is shown. FIG. 7 is an illustrative perspective view of a connector module according to an exemplary embodiment of the present invention, wherein the terminal locking member 2 is in the final locking position. FIG. 8 is a longitudinal cross-sectional view of a connector module according to an exemplary embodiment of the present invention, with terminal locking member 2 in the final locking position.

As shown in FIGS. 1-8, a terminal slot 101 for accommodating the terminal 3 and a tool insertion port 12 connected to the terminal slot 101 are formed in the insulator 1. The terminal locking member 2 is installed on the insulator 1 and can be moved between a pre locking position separated from the terminal 3 and a final locking position engaged with the terminal 3. When the terminal locking member 2 is in the pre lock position, the terminal 3 can be inserted into and pulled out of the terminal slot 101. When the terminal locking member 2 is in the final locking position, the inserted terminal 3 is locked in the terminal slot 101 by the terminal locking member.

In the illustrated embodiments, when the terminal locking member 2 is in the pre locking position, the tool insertion port 12 is not blocked by the terminal locking member to allow an operating tool 4 to be inserted into the terminal slot 101 through the tool insertion port. This enables a locking spring 31 of the terminal 3 to be moved to an unlocked position separated from the insulator 1 by the inserted operating tool. When the terminal locking member 2 is in the final locking position, the tool insertion port 12 is blocked by the terminal locking member 2 to prevent the operating tool 4 from being inserted into the terminal slot 101 through the tool insertion port 12. This prevents the locking spring 31 of the terminal 3 from being accidentally unlocked by the operating tool 4. In this way, mis operation can be avoided and the safety of product use can be improved.

A locking part slot 11 connected to the terminal slot 101 is also formed in the insulator 1. The terminal locking member 2 includes a main body part 20, a locking part 21, and a blocking part 22. The locking part 21 is connected to the main body part 20 and inserted into the locking part slot 11. The blocking part 22 is connected to the main body part 20 for blocking the tool insertion port 12. When the terminal locking member 2 is in the pre locking position, the locking part 21 is separated from the terminal 3, and the tool insertion port 12 is not blocked by the blocking part 22. When the terminal locking member 2 is in the final locking position, the locking part 21 is engaged with the terminal 3, and the tool insertion port 12 is blocked by the blocking part 22.

An engagement slot 16 is also formed in the insulator 1. The terminal locking member 2 also includes an engagement part 26, which is connected to the main body part 20 and inserted into the engagement slot 16. An engagement protrusion 26*a* is formed on the engagement part 26, and an engagement surface 16*a* is formed on the side wall of the engagement slot 16. When the terminal locking member 2 is in the pre locking position, the engagement protrusion 26*a* is pressed against the engagement surface 16*a* to prevent the terminal locking member from being moved in the direction of separation from the insulator 1. In the illustrated embodiment, the engagement surface 16*a* is an inclined plane that can provide a predetermined blocking force.

A pair of elastic arms 23 are formed on the main body part 20. Protrusion parts 24 are formed on both sides of the pair of elastic arms 23 facing each other, and a pre locking surface 24*a* is formed on the lower side of the protrusion parts. A raised rib 13 is formed on insulator 1, mating protrusion parts 14 are formed on both sides of the raised rib 13, and a mating pre locking surface 14*a* is formed on the upper side of the mating protrusion part 14. When the terminal locking member 2 is in the pre locking position, the pre locking surface 24*a* on the terminal locking member is pressed against the mating pre locking surface 14*a* on the insulator 1 to prevent the terminal locking member from being moved towards the final locking position and to hold the terminal locking member in the pre locking position.

Still referring to FIGS. 1-8, a final locking surface 24*b* is formed on the upper side of the protrusion part 24 of the terminal locking member 2, and a mating final locking surface 14*b* is formed on the lower side of the mating protrusion part 14 of the insulator 1. When the terminal locking member 2 is in the final locking position, the final locking surface 24*b* on the terminal locking member is pressed against the mating final locking surface 14*b* on the insulator 1 to prevent the terminal locking member from being moved towards the pre locking position and to hold the terminal locking member in the final locking position.

An accommodating recess 120 is formed on the insulator 1 for receiving the main body part 20. The main body part 20 is installed in the accommodating recess 120. When the terminal locking member 2 is in the final locking position, the top surface of the main body part 20 is flush with the top surface of the insulator 1.

The main body part 20 is in a flat plate shape, and the raised rib 13 protrudes from the bottom surface of the accommodating recess 120 to a predetermined height and is inserted between the pair of elastic arms 23. When the terminal locking member 2 is in the final locking position, the bottom surface of the main body part 20 is pressed against the bottom surface of the accommodating recess 120 to limit the terminal locking member at the final locking position.

The locking part slot 11, the tool insertion port 12, and the engagement slot 16 are connected to the accommodating recess 120. The engagement slot 16 is connected to the locking part slot 11 and the terminal slot 101. The terminal slot 101 extends along the length direction of insulator 1, and the locking part slot 11 extends along the width direction of insulator. The front end face of the terminal locking member 2 is flush with the front end face of insulator 1, and the tool insertion port 12 is formed on the front end face of insulator.

The terminal 3 is inserted into the terminal slot 101 along the length direction of insulator 1. The locking part 21 extends continuously along the width direction of the insulator 1, and has a locking surface 21*a* perpendicular to the length direction of the insulator. The locking surface 21*a* is used to rest against the terminal 3 to lock the terminal in the terminal slot 101. In the illustrated embodiment, the main body part 20 is rectangular, and the engagement part 26 is formed at each of the four corner parts of the main body part 20. The locking part 21 is connected between two engagement parts 26 on the rear side of the main body part 20.

An engagement hole 25 is formed on the protrusion part 24 of the elastic arm 23, which is adapted to engage with an unlocking tool (not shown) to drive the protrusion parts 24 of the pair of elastic arms 23 to the unlocking position separated from the mating protrusion part 14 through the unlocking tool. The elastic arm 23 extends along the length direction of the insulator 1 and its two ends are fixed, with the protrusion part 24 located on the middle part of the elastic arm.

The connector module further includes a terminal 3, which is inserted into the terminal slot 101 of the insulator 1. The terminal 3 has a locking spring 31 (commonly referred to as a primary lock) that is locked to the inner wall of the terminal slot 101. Multiple terminal slots 101 are formed in the insulator 1, and the connector module includes multiple terminals 3, which are respectively inserted into multiple terminal slots 101. The locking part slot 11 is connected to multiple terminal slots 101, and the locking part 21 partially extends into multiple terminal slots 101 through the locking part slot to simultaneously lock multiple terminals 3.

Figure 9:
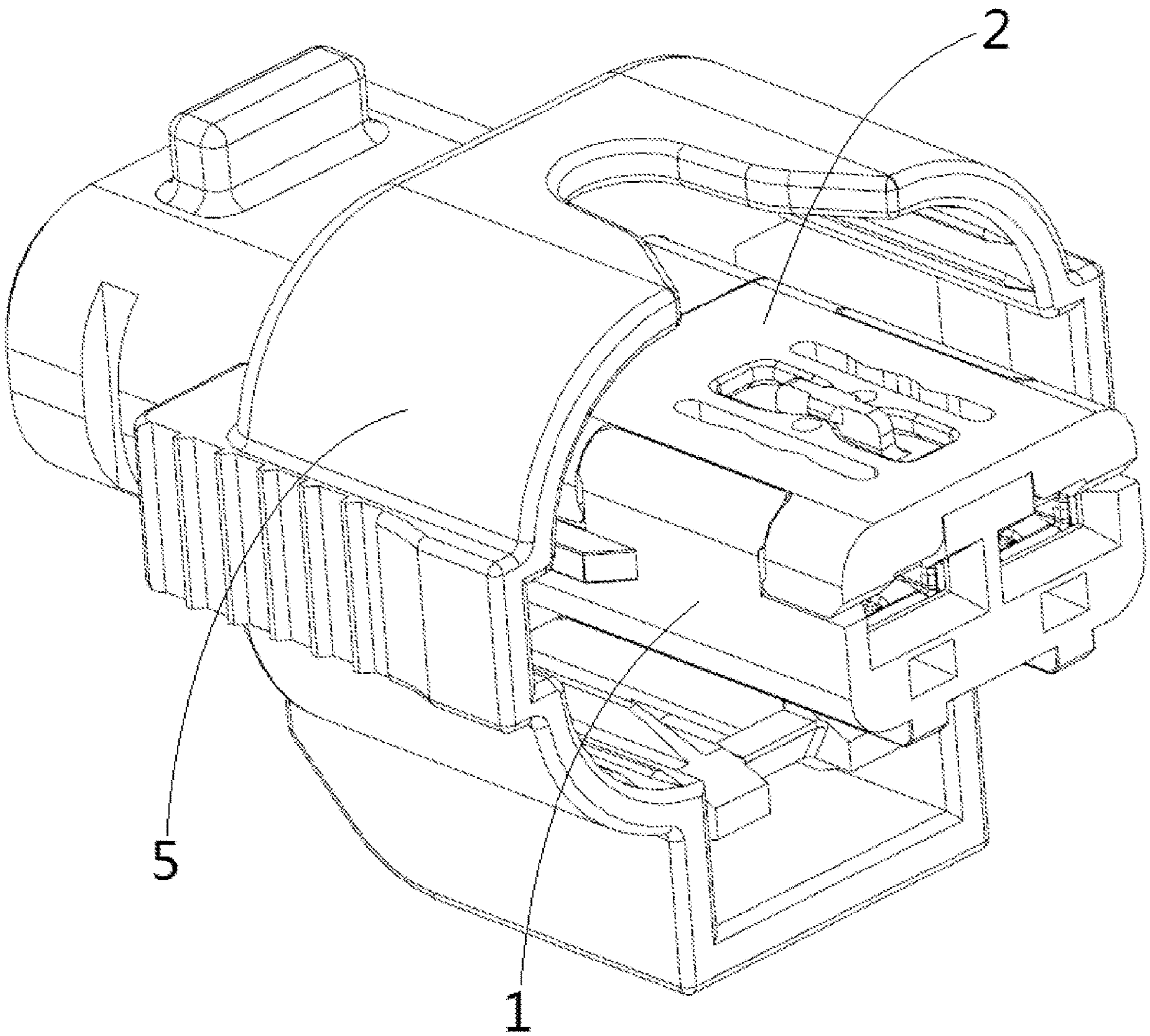
FIG. 9 is an illustrative perspective view of a connector according to an exemplary embodiment of the present invention.

FIG. 9 is an illustrative perspective view of a connector according to an exemplary embodiment of the present invention. As shown in FIGS. 1-9, in another exemplary embodiment of the present invention, a connector is also disclosed. The connector includes a housing 5 and the aforementioned connector module. The connector module is installed in the housing 5.

In another exemplary embodiment of the present invention, a connector assembly is also disclosed. The connector assembly includes the aforementioned connector and a mating connector (not shown) which is mated with the aforementioned connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector module, comprising:

an insulator, defining:

a terminal slot adapted to receive a terminal; and a tool insertion port in communication with the terminal slot; and a terminal locking member arranged on the insulator and movable between a pre locking position separated from the terminal and a final locking position engaged with the terminal, the terminal locking member includes a main body part, a pair of elastic arms are formed on the main body part, when the terminal locking member is in the pre locking position, the tool insertion port is not blocked by the terminal locking member, and when the terminal locking member is in the final locking position, the tool insertion port is blocked by the terminal locking member.

2. The connector module according to claim 1, wherein the terminal locking member includes:

a locking part connected to the main body part and inserted into a locking part slot formed in the insulator, the locking part slot in communication with the terminal slot; and a blocking part connected to the main body part and adapted to block the tool insertion port, when the terminal locking member is in the pre locking position, the locking part is separated from the terminal, and the tool insertion port is not blocked by the blocking part, and when the terminal locking member is in the final locking position, the locking part is engaged with the terminal, and the tool insertion port is blocked by the blocking part.

3. The connector module according to claim 2, wherein:
the insulator further defines an engagement slot having an engagement surface formed on a side wall of the engagement slot;
the terminal locking member further includes an engagement part connected to the main body part and inserted into the engagement slot, the engagement part having an engagement protrusion formed thereon, wherein when the terminal locking member is in the pre locking position, the engagement protrusion is engaged with the engagement surface and prevents the terminal locking member from being moved in a direction of separation from the insulator.

4. The connector module according to claim 3, wherein:
protrusion parts are formed on both sides of the pair of elastic arms facing each other, and a pre locking surface is formed on the lower side of the protrusion part; and
a raised rib is formed on the insulator, mating protrusion parts are formed on both sides of the raised ribs, and a mating pre locking surface is formed on the upper side of the mating protrusion part.

5. The connector module according to claim 4, wherein, when the terminal locking member is in the pre locking position, the pre locking surface on the terminal locking member is engaged with the mating pre locking surface on the insulator and prevents the terminal locking member from being moved towards the final locking position and maintain the terminal locking member in the pre locking position.

6. The connector module according to claim 5, wherein:
a final locking surface is formed on the upper side of the protrusion part of the terminal locking member, and a mating final locking surface is formed on the lower side of the mating protrusion part of the insulator; and
when the terminal locking member is in the final locking position, the final locking surface on the terminal locking member is engaged with the mating final locking surface on the insulator and prevents the terminal locking member from being moved towards the pre locking position and maintain the terminal locking member in the final locking position.

7. The connector module according to claim 6, wherein an accommodating recess is formed on the insulator and receives the main body part, and the main body part is installed in the accommodating recess.

8. The connector module according to claim 7, wherein, when the terminal locking member is in the final locking position, the top surface of the main body part is flush with the top surface of the insulator.

9. The connector module according to claim 7, wherein the main body part is formed as a flat plate shape, and the raised rib protrudes a predetermined height from a bottom surface of the accommodating recess and is inserted between the pair of elastic arms.

10. The connector module according to claim 9, wherein when the terminal locking member is in the final locking position, the bottom surface of the main body part is pressed against the bottom surface of the accommodating recess and limiting the terminal locking member at the final locking position.

11. The connector module according to claim 8, wherein the locking part slot, the tool insertion port, and the engagement slot are in communication with the accommodating recess, and the engagement slot is in communication with the locking part slot and the terminal slot.

12. The connector module according to claim 11, wherein:
the terminal slot extends along a length direction of the insulator, and the locking part slot extends along a width direction of the insulator; and
the front end face of the terminal locking member is flush with the front end face of the insulator, the tool insertion port is formed on the front end face of the insulator.

13. The connector module according to claim 12, wherein the locking part extends continuously along the width direction of the insulator and includes a locking surface perpendicular to the length direction of the insulator, the locking surface is adapted to rest against the terminal to lock the terminal in the terminal slot.

14. The connector module according to claim 13, wherein the main body part is rectangular, and the engagement parts are formed at respective corners of the main body part.

15. The connector module according to claim 14, wherein the locking part is connected between two engagement parts on a rear side of the main body part.

16. The connector module according to claim 4, wherein an engagement hole is formed in the protrusion part of the elastic arm and is adapted to engage with an unlocking tool for driving the protrusion parts of the pair of elastic arms to an unlocking position separated from the mating protrusions.

17. The connector module according to claim 16, wherein the elastic arm extends along the length direction of the insulator, and both ends of the elastic arm are fixed, the protrusion part is formed on the middle part of the elastic arm.

18. The connector module according to claim 2, further comprising a terminal inserted into the terminal slot of the insulator, the terminal including the locking spring that locks onto the inner wall of the terminal slot.

19. The connector module according to claim 18, wherein:
multiple terminal slots are formed in the insulator, and the connector module includes multiple terminals, which are respectively inserted into the multiple terminal slots; and
the locking part slot is in communication with the multiple terminal slots, and the locking part partially extends into the multiple terminal slots through the locking part slot to simultaneously lock the multiple terminals.

20. A connector, comprising:
a housing; and
a connector module arranged in the housing, including:
an insulator, defining:
a terminal slot adapted to receive a terminal; and
a tool insertion port in communication with the terminal slot; and
a terminal locking member arranged on the insulator and movable between a pre locking position separated from the terminal and a final locking position engaged with the terminal, the terminal locking member includes a main body part, a pair of elastic arms are formed on the main body part, wherein:
when the terminal locking member is in the pre locking position, the tool insertion port is not blocked by the terminal locking member and adapted to allow an operating tool to be inserted into the terminal slot through the tool insertion port to drive a locking spring of the terminal to an unlocking position separated from the insulator; and
when the terminal locking member is in the final locking position, the tool insertion port is blocked by the terminal locking member and adapted to prevent the operating tool from being inserted into the terminal slot through the tool insertion port.

* * * * *